(12) United States Patent
Fernandes de Oliveira et al.

(10) Patent No.: US 11,176,024 B1
(45) Date of Patent: Nov. 16, 2021

(54) SOFTWARE PATCH APPLICATION AND TESTING OPTIMIZATION

(71) Applicant: International Business Machines Corporation, Armonk, NY (US)

(72) Inventors: Marcelo Fernandes de Oliveira, Sorocaba (BR); Jose Soares Junior, Lavrinhas (BR); Danne Meira Castro Aguiar, Indaiatuba (BR); Clayton Ceragioli Junior, Indaiatuba (BR); Marco Aurelio Stelmar Netto, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/029,567

(22) Filed: Sep. 23, 2020

(51) Int. Cl.
  *G06F 11/36* (2006.01)
  *G06F 8/65* (2018.01)
  *G06F 16/22* (2019.01)

(52) U.S. Cl.
  CPC .............. *G06F 11/368* (2013.01); *G06F 8/65* (2013.01); *G06F 11/3676* (2013.01); *G06F 11/3696* (2013.01); *G06F 16/22* (2019.01)

(58) Field of Classification Search
  None
  See application file for complete search history.

(56) References Cited

U.S. PATENT DOCUMENTS

| 5,351,287 A | 9/1994 | Bhattacharyya |
| 6,920,631 B2 | 7/2005 | Delo |
| 7,000,247 B2 | 2/2006 | Banzhof |
| 7,065,740 B2 | 6/2006 | Westerinen |
| 7,373,446 B2 | 5/2008 | Post |
| 7,428,541 B2 | 9/2008 | Houle |
| 8,424,094 B2 | 4/2013 | Neystadt |
| 8,464,057 B2 | 6/2013 | Mccreight |
| 8,898,627 B2 | 11/2014 | Gass |
| 8,972,963 B2 | 3/2015 | Baset |
| 9,009,694 B2 | 4/2015 | Dirico |
| 9,032,382 B1 | 5/2015 | Feeser |
| 9,092,301 B2 | 7/2015 | Blumfield |

(Continued)

FOREIGN PATENT DOCUMENTS

CN 106547690 B 3/2017

*Primary Examiner* — Qing Chen
*Assistant Examiner* — Clint Thatcher
(74) *Attorney, Agent, or Firm* — William Hartwell; Andrew D. Wright; Roberts Calderon Safran & Cole, P.C.

(57) ABSTRACT

One or more computer processors receive a patch request containing a testing requirement for a target platform. The one or more computer processors create a plurality of clusters containing a plurality of previously patched platforms associated with the target platform. The one or more computer processors calculate a similarity index of previously patched platforms and the target platform utilizing the created plurality of clusters, wherein the similarity index represents a similarity between the target platform and the plurality of patched platforms. The one or more computer processors adjust the testing requirement utilizing one or more similar platforms that are determined by the calculated similarity index and associated testing requirements. The one or more computer processors execute the requested patch utilizing the adjusted testing requirement.

20 Claims, 4 Drawing Sheets

(56) References Cited

U.S. PATENT DOCUMENTS

| | | |
|---|---|---|
| 2005/0086534 A1 | 4/2005 | Hindawi |
| 2006/0080656 A1* | 4/2006 | Cain .................. G06F 8/65 |
| | | 717/174 |
| 2006/0287842 A1* | 12/2006 | Kim .................. G01H 9/004 |
| | | 702/183 |
| 2006/0294413 A1* | 12/2006 | Filz .................. G06F 11/1433 |
| | | 714/4.4 |
| 2007/0106978 A1 | 5/2007 | Felts |
| 2010/0162226 A1* | 6/2010 | Borissov ............ G06F 8/656 |
| | | 717/173 |
| 2012/0151469 A1 | 6/2012 | Wookey |
| 2012/0331455 A1 | 12/2012 | Ayachitula |
| 2016/0259636 A1 | 9/2016 | Henrik |
| 2018/0293152 A1* | 10/2018 | Kazemzadeh ........ G06F 11/368 |
| 2019/0129712 A1 | 5/2019 | Kathryn |
| 2019/0370471 A1 | 12/2019 | Spiros |
| 2020/0020356 A1 | 1/2020 | Smith |
| 2020/0089485 A1* | 3/2020 | Sobran .................. G06F 8/65 |

\* cited by examiner

SOFTWARE PATCH APPLICATION AND TESTING OPTIMIZATION

BACKGROUND

The present invention relates generally to the field of software management, and more particularly to software patching optimization.

A patch is a set of changes to a computer program, application, or associated supporting data designed to update, fix, or improve said program. This includes fixing security vulnerabilities and programmatic bugs while improving the functionality, usability, or performance of the program. Patches may be installed either under programmatic control or by a human programmer using an editing tool or a debugger. Patches may be applied to program files on a storage device, or in computer memory. Patch management is the process of using a strategy and plan of what patches should be applied to which systems at a specified time. Patch management is an essential part of lifecycle management.

SUMMARY

Embodiments of the present invention disclose a computer-implemented method, a computer program product, and a system. The computer-implemented method includes one or more computer processers receiving a patch request containing a testing requirement for a target platform. The one or more computer processors create a plurality of clusters containing a plurality of previously patched platforms associated with the target platform. The one or more computer processors calculate a similarity index of previously patched platforms and the target platform utilizing the created plurality of clusters, wherein the similarity index represents a similarity between the target platform and the plurality of patched platforms. The one or more computer processors adjust the testing requirement utilizing one or more similar platforms that are determined by the calculated similarity index and associated testing requirements. The one or more computer processors execute the requested patch utilizing the adjusted testing requirement.

DETAILED DESCRIPTION

Efficient and effective patch application in information technology systems is a vital process, specifically managing vast quantities of diverse computing systems and platforms with respect to security issues, bug fixes, and the implementation of new features. However, managing and applying patches is time consuming and computationally expensive, especially if there is a large variety of computing platforms such as in large server virtualized cloud environments. Patch management often involves a diverse collection of patch information and collaboration from several stakeholders, including auditors, technicians, security experts, and even executive personnel.

Embodiments of the present invention generate a similarity index of computing platform (i.e., software and hardware) using a machine learning cluster algorithm. Embodiments of the present invention determine a managed reduction in an amount of computing related tests utilizing the generated similarity index. Embodiments of the present invention determine a managed reduction in a number of executed tests based on the generated similarity index and compilation of patch information collected from prior patched platforms. Embodiments of the present invention implements a tracking system to identify effective testing reductions based on incident detection utilizing information derived from patch applications in similar platforms. Embodiments of the present invention reduce the amount of computational work and resources required apply patches in large data centers by gradually reducing testing requirements. Implementation of embodiments of the invention may take a variety of forms, and exemplary implementation details are discussed subsequently with reference to the Figures.

The present invention will now be described in detail with reference to the Figures.

Figure 1:
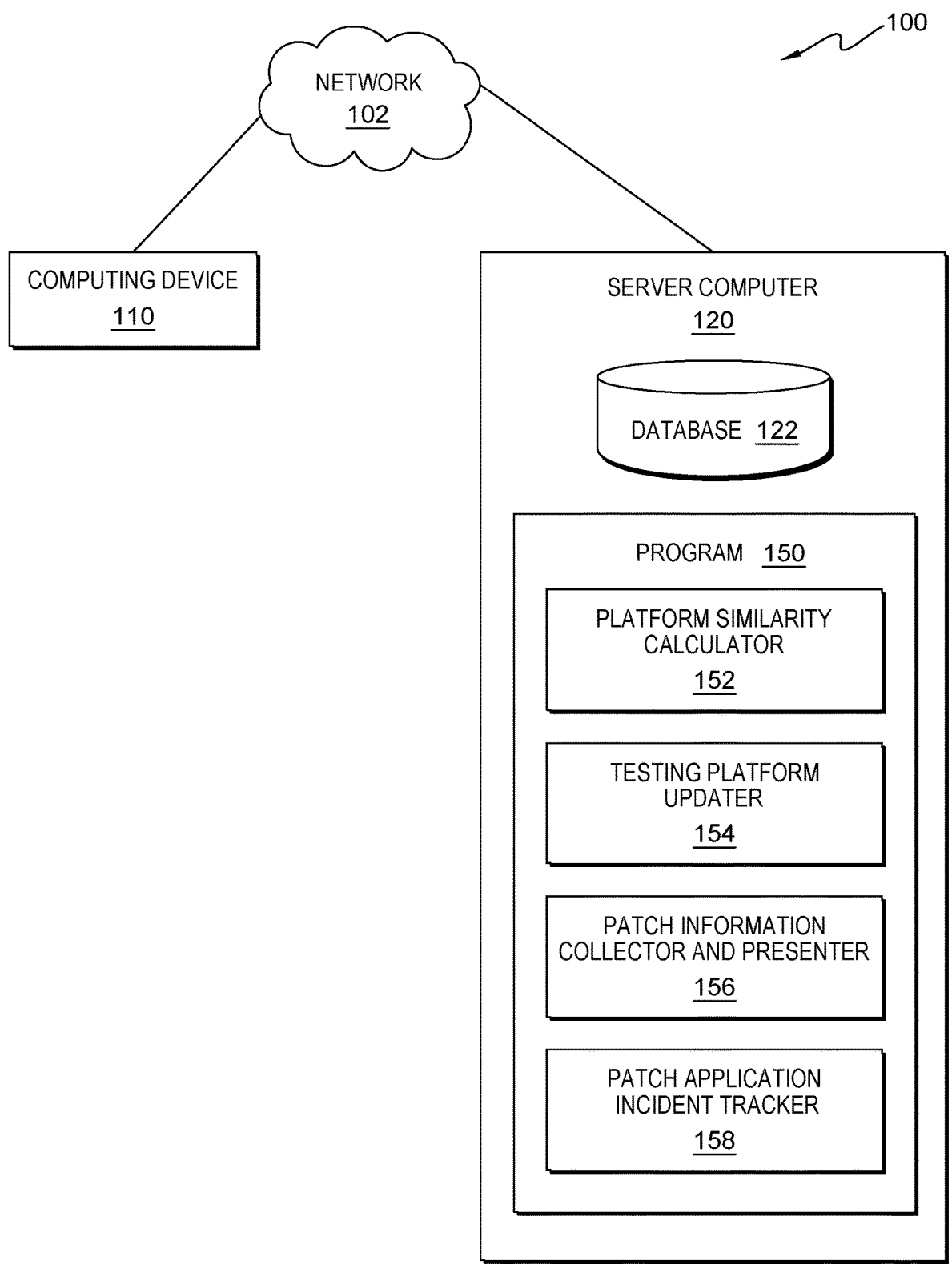
FIG. 1 is a functional block diagram illustrating a data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), a smart phone, or any programmable electronic device capable of communicating with network 102. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In an embodiment, computing device 110 is representative of a platform (i.e., software and/or hardware stack) that has already received and implemented a patch. In an alternative embodiment, computing device 110 is representative of a target platform that has not already received and/or implemented a patch.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with computing device 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted, and described in further detail with respect to FIG. 4.

Database 122 is a repository for data used by program 150. In the depicted embodiment, database 122 resides on server computer 120. In another embodiment, database 122 may reside elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical patch applications, associated statistics and information provided by multiple stakeholders. For example, auditors provide change numbers, target dates, target versions, and implementation dates; technicians provide host names, platforms, current versions, target versions, and target dates; security personnel provide patch advisory IDs, target dates, and implementation dates, application maintainers provide current versions, target versions, patch advisory IDs, host names, platforms and impact assessments (e.g., anticipated system effect); and executive personnel provide patch severity, target dates, implementation dates, host counts, and impact assessments. In an embodiment, database 122 is structured utilizing hierarchical logging methods.

Program 150 is a program for software patch application testing optimization based on clustered cross-platform similarity indexes. In various embodiments, program 150 may implement the following steps: receive a patch request containing a testing requirement for a target platform; create a plurality of clusters containing a plurality of previously patched platforms associated with the target platform; calculate a similarity index of previously patched platforms and the target platform utilizing the created plurality of clusters, wherein the similarity index represents a similarity between the target platform and the plurality of patched platforms; adjust the testing requirement utilizing one or more similar platforms that are determined by the calculated similarity index and associated testing requirements; and execute the requested patch utilizing the adjusted testing requirement. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within distributed data processing environment 100. In the depicted embodiment, program 150 includes platform similarity calculator 152, testing protocol updater 154, patch information collector and presenter 156, and patch application incident tracker 158. Platform similarity calculator 152 calculates how similar a target platform is to other platforms that have previously received a patch, where a platform includes a software and/or hardware stack, as described in step 206. Testing protocol updater 154 maintains a number of tests required to verify a patch application, including invasion tests, server stress test, etc. Patch information collector and presenter 156 collects and presents to the patch stakeholders patch information associated with already patched platforms. Patch application incident tracker 158 tracks incidents (e.g., system errors, application errors, user feedback, system performance statistics (i.e., central processing unit (CPU) utilization, graphical processing unit (GPU) utilization, GPU memory utilization, CPU memory utilization, and number of spawned CPU processes, memory utilization, etc.)), related platforms that have received and implementations one or more patches, as described in step 210. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
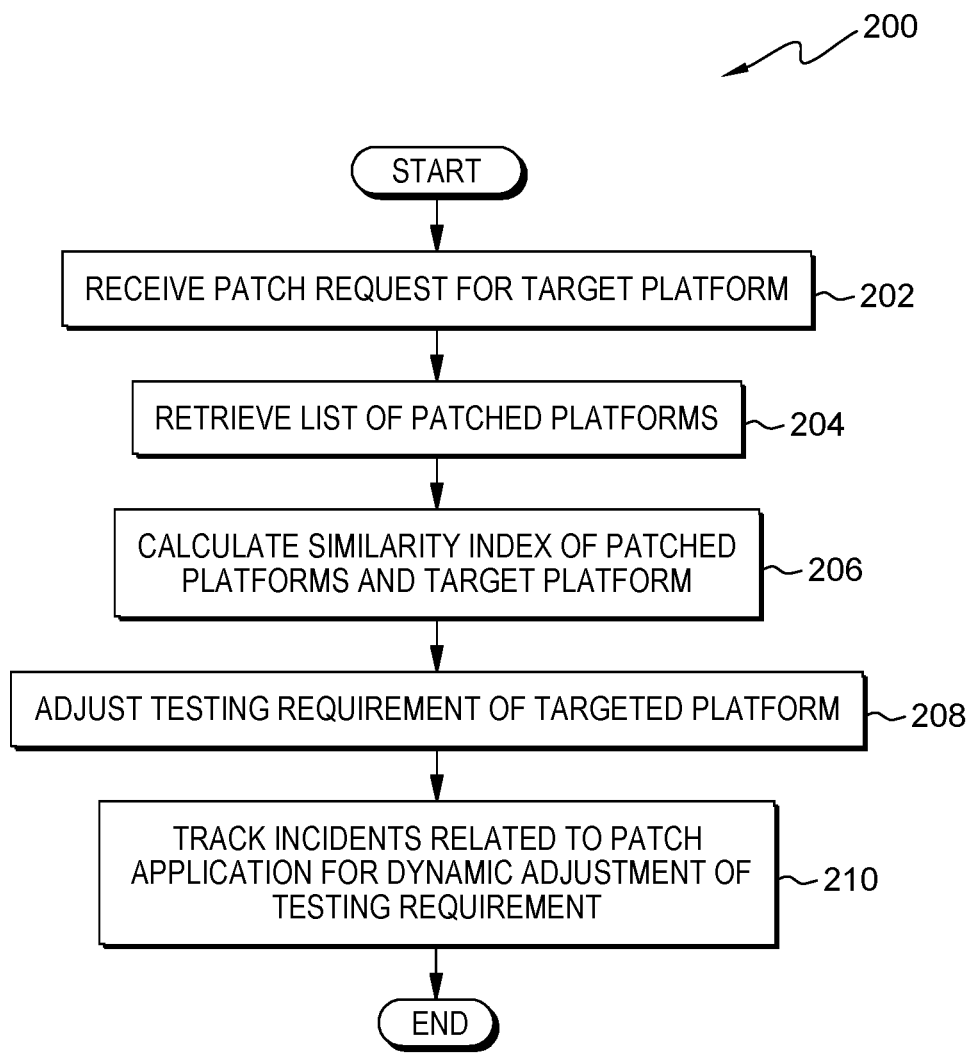
FIG. 2 is a flowchart depicting operational steps of a program, on a server computer within the data processing environment of FIG. 1, for software patch application testing optimization based on clustered cross-platform similarity indexes, in accordance with an embodiment of the present invention.

FIG. 2 depicts flowchart 200 illustrating operational steps of program 150 for software patch application testing optimization based on clustered cross-platform similarity indexes, in accordance with an embodiment of the present invention.

Program 150 receives a patch request (step 202). In an embodiment, program 150 initiates responsive to completed patch development. In another embodiment, program 150 commences responsive to a received or pushed patch. In another embodiment, program 150 monitors one or more applications installed on a computing device (e.g., computing device 110) for incoming or scheduled patches and holds said patches until further testing, verification, and/or approval. In another embodiment, program 150 integrates into an existing patch and incident management system and monitors for future patches and associated incidents, as described in step 210.

Responsive to a received patch or patch request, program 150 retrieves platform information associated with the target platform for the patch, where the information includes, but is not limited to, operating system flavor, operating system version, software names and versions, previously (i.e., historical) applied patches, etc. In an embodiment, program 150 retrieves associated platform information regarding platforms that depend or are dependent on the target platform. In an embodiment, program 150 retrieves a protocol (i.e., testing requirement) for execution of tests associated with the target platform. For example, the protocol is retrieved from a patch and incident management system, where program 150 controls the execution of tests after a patch is applied. For example, program 150 retrieves a protocol requiring a stress test with 10,000 runs of type T.

In an embodiment, program 150 scans (e.g., depth-first scanning, etc.) a patch filesystem, identifying all subcomponents (e.g., dependencies, subprograms, etc.) subfiles and subfolders contained within. In this embodiment, program 150 identifies said subcomponents by creating one or more sets of filesystem information such as filenames, folder names, parent folders, subfolders, associated permissions, creation dates, modified dates, and associated metadata. In another embodiment, program 150 scans through each folder contained in or associated with the patch. In this embodiment, program 150 begins at a root folder and recursively follows each subfolder down to instances where no subfolders or files exist. In various embodiments, program 150 creates a set of patch changes information that includes changelogs, bug fixes, new introduced features, developer suggestions, and details of any existing limitations. Here, program 150 maintains a list of image differences including all changed files and associated metadata. In an embodiment, program 150 utilizes the list of identified software to identify and retrieve patch and changelog information describing one or more changes in the updated patch and/or an overall purpose for the updated patch. For example, program 150 receives a patch and from an associated changelog, program 150, utilizing natural language processing techniques, parses the changelog.

In another embodiment, program 150 identifies a purpose and/or one or more features associated with the target platform and/or application. In this embodiment, program 150 receives, retrieves, or identifies one or more functions associated with the application. For example, an example application is utilized to host a web server. Here, program 150 determines that the purpose of the application is to publicly serve one or more webpages. Additionally, program 150 determines one or more features associated with the purpose, for example ability to be accessed externally, ability to serve webpages, ability to securely access a database, and additional security considerations (e.g., file permissions, etc.). In a further embodiment, program 150 weighs each determined feature of the application to determine the most critical features associated with a determined application purpose. For example, an ability to publicly present web content is a critical feature of a webserver application.

Program 150 retrieves a list of patched platforms (step 204). In an embodiment, program 150 retrieves (e.g., patch information collector and presenter 156) a list of patched platforms (e.g., cross-platform) from a patch and incident management system that contains platforms that one or more patches have previously been applied, all associated testing has been executed, and patch information collected/extracted. Here, patch information includes application benchmarks (e.g., pre and post patch), system benchmarks, application validity tests (e.g., unit testing, etc.), and associated platform information (e.g., hardware specifications, system preferences, application preferences, user preferences, software dependencies and version information, platform category, etc.).

Program 150 calculates similarity index of patched platforms and the target platform (step 206). In an embodiment, based on the target platform, the list of patched platforms and associated patch information, program 150 creates one or more clusters of patched platforms. In an embodiment, program 150 creates a plurality of clusters, each utilizing a range of features including operating system flavor (e.g., category), operating system version, software names and versions, previously applied patches and associated platforms, platforms that depend on or are dependent on the target platform and system load (CPU utilization, memory, networking, etc.). In this embodiment, program 150 utilizes a machine learning algorithm to cluster platforms by considering each platform characteristic (i.e., specification) as feature of the algorithm. For example, program 150 utilizes K-Mean clustering to cluster said platforms utilizing one or more features. In an additional embodiment, program 150 utilizes a number of incidents caused by a reduction in patch testing as feature, linking a training of the clustering algorithm with the impact incidents caused by the reduction of testing of patched platforms. Here, program 150 utilizes said feature to reduce the tests of a given platform in such a way that incidents caused by such reduction do not increase (in number and in impact). In another embodiment, program 150 utilizes an adjustment testing factor that generates a given number of incidents due to reduction of tests. For example, program 150 retains a set of features that contain the following: number of incidents caused by the reduction of 5% testing, number of incidents caused by the reduction of 10% testing, . . . , number of incidents caused by the reduction of N % of testing of patches. In an embodiment, program 150 utilizes the number of incidents in a patch category as a feature. For example, number of incidents caused by the reduction of level-1 testing, number of incidents caused by the reduction of level-2 testing, number of incidents caused by the reduction of level-3 testing, wherein each level-N corresponds to an amount and type of tests that could be eliminated. In various embodiments, program 150 adds one or more weights (e.g., impact) to such incidents and utilizes the weighted incidents as features. In a further embodiment, program 150 utilizes the sum of the impact of associated incidents as an additional feature. For example, a set of incidents are weighted as such, incident1 associated with an impact weight of 2 (low impact), incident2 associated with an impact weight of 5 (medium impact), and incident3 associated with an impact weight of 20 (high impact). Here, program 150 sums, $$\sum_{i=0}^{number\ of\ incidents}$$

impact_i, all the incidents formulating a total incident value for a specific set of test reductions.

Responsive to program 150 clustering the platforms, program 150 calculates (i.e., platform similarity calculator 152) a plurality of similarity indexes (e.g., numerical probability, ranked list, etc.), utilizing the clustered platforms, representing how similar the target platform is from each of the platforms that have been patched. In an embodiment, program 150 utilizes the clusters to calculate a Euclidean distance between the centers of each cluster to the target platform as the calculated similarity index. In an embodiment, each clustered platform is associated with a testing requirement representing the number of tests required, along with associated type of test, to allow further patch proliferation (e.g., sending the patch out to more devices and/or devices of greater strategical importance). Program 150 collects patch application information (e.g., testing information (e.g., passed tests, failed tests, associated performance metrics, etc.), associated testing requirements, associated similarity indexes, etc.) for platforms similar to the target platform. In an embodiment, program 150 collects patch application information for platforms that exceed a predetermined similarity index. In an embodiment, patch application information is provided for similar platforms that previously received the patch and tests, in order to increase confidence for a decision maker (e.g., stakeholder) to approve or reject a test reduction (i.e., testing requirement adjustment). In an embodiment, program 150 determines a scope (e.g., intention) of the patch and reconciles the scope with the purpose of the application. Here, program 150 utilizes the information retrieved and extracted from steps 202 and 204 to determine the scope of the patch and the general purpose of the application. In an embodiment, program 150 utilizes the determined scope to adjust the calculated similarity index. For example, if program 150 determines that a scope is vital (e.g., no available workarounds or redundancy) to a system or dependency, program 150 decreases the calculated similarity index for all platforms or increases the similarity index threshold to allow only highly similar platforms to be considered in subsequent calculations and determinations.

Program 150 adjusts testing requirement of target platform (step 208). In an embodiment, program 150 adjusts (i.e., testing platform updater 154) an amount of testing required for the target platform utilizing associated calculated similarity indexes. In an embodiment, based on the cluster created for the target platform and the calculated similarity index, program 150 modifies the number and types of tests according to one or more associated testing requirements of one or more similar platforms contained in clusters in a proximity to the target platform. In another embodiment, a pre-established or user-defined threshold system to adjust testing requirements. For example, if 100 platforms are highly similar, based on a calculated similarity index, then program 150 reduces the amount of testing required by 10%. In a further example, program 150 specifically reduces stress tests by 10%, freeing the computational resources required to complete the patch application process. In a further embodiment, the testing requirement represents the number of successful tests (e.g., conducted by similar platforms) needed to apply the patch to the target platform (e.g., every device in the target platform group). In this step, program 150 determines a reduction in testing requirements while still maintaining high patch acceptance and compliance standards utilizing testing requirements and information derived from similar patched platforms.

In an embodiment, responsive to a determined testing reduction, program 150 obtains approval to initiate the testing reduction and commence subsequent patch application and testing for a plurality of unpatched target platforms. In an embodiment, program 150 presents (e.g. generates a report or displays the list of similar platforms and associated patch information) a user with a plurality of suggested testing requirements based on the analysis above. In another embodiment, program 150 updates the patch and incident management system with information regarding the updating platforms and associated testing. In an embodiment, program 150 utilizes the determined scope to further modify the testing reduction by requiring that scopes with critical applications or dependencies are restricted from automatically deploying and require human acknowledgement and approval. In another embodiment, program 150 automatically initiates a patch execution, with reduced testing requirements, based on specified thresholds, such as a requirement threshold. In an embodiment, program 150 automatically updates and deploys an updated application if the patch and target platform exceed a requirement threshold. Alternatively, if the requirement value does not exceed the requirement threshold, then program 150 executes (i.e., applies) an unmodified patch and testing procedure, without any testing reduction.

Program 150 tracks incidents related to the patch for adjustment of required testing (step 210). In an embodiment, program 150 tracks (i.e., patch application incident tracker 158) patching and testing via a generation of incidents related to an applied patch. In an embodiment, program 150 re-adjusts the associated protocol (e.g., testing requirement) for the target platform or category of platform if N number of incidents (e.g., regressions, errors, performance degradations, unexpected behaviors, etc.) related to the applied patch are generated. In this embodiment, program 150 dynamically continues to adjust testing requirements as more platforms are patched and incidents are generated. In an embodiment, program 150 tracks one or more incidents related to the executed patch for dynamic adjustment of the testing requirement and subsequent patching to unpatched platforms similar to the target platform. In a further embodiment, the testing requirement includes necessary benchmarks and completed tests required to advance patching to other platforms (e.g., more critical platforms receive the patch as testing is completed for non-critical platforms). In an embodiment, program 150, automatically, deploys the updated application and associated dependencies to another host or cluster of hosts. In an embodiment, program 150 containerizes the patched platform and/or application.

Figure 3:
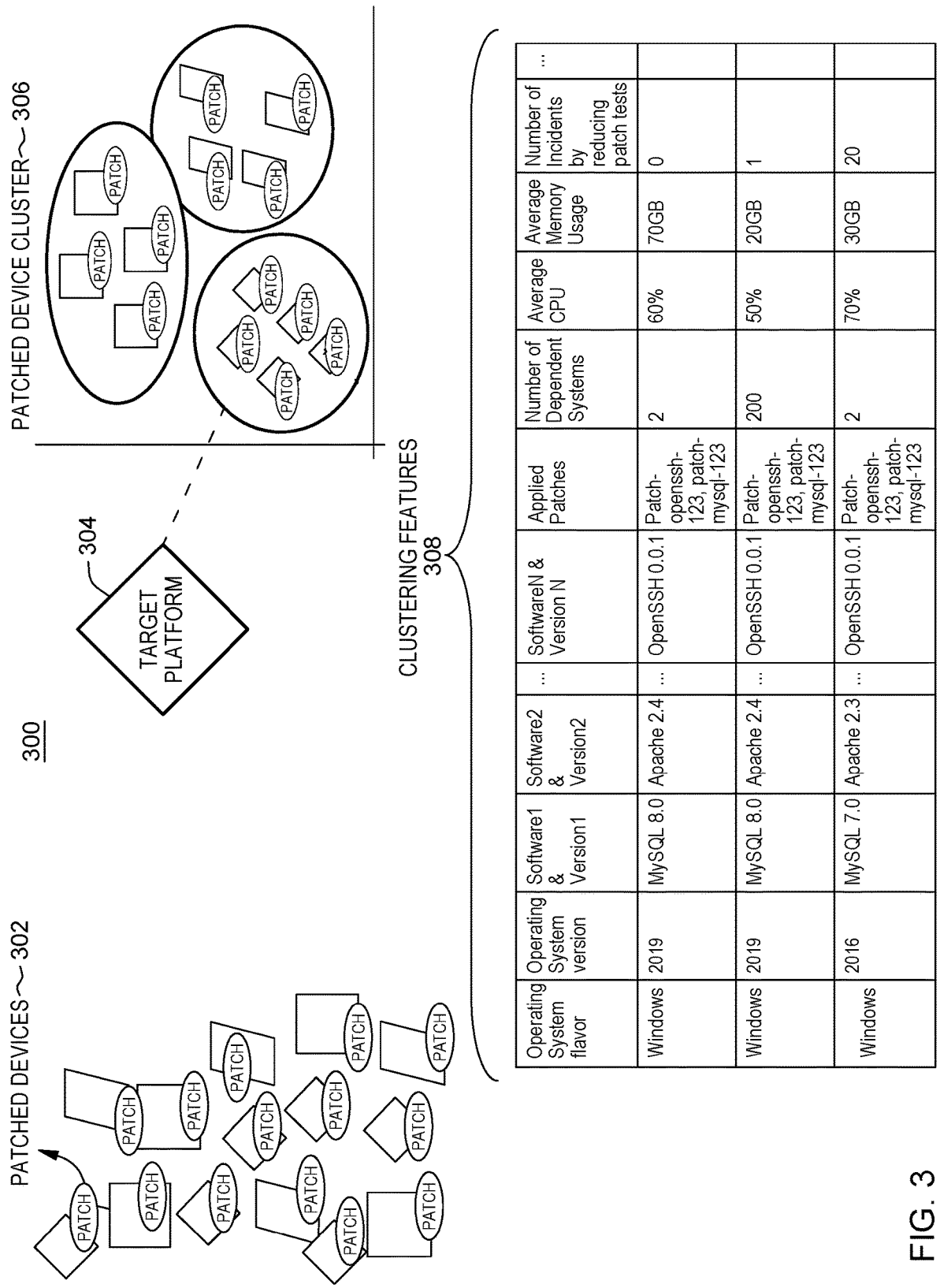
FIG. 3 is an illustration of clustered previously patched platforms, in accordance with an embodiment of the present invention.

FIG. 3 depicts illustration 300, in accordance with an illustrative embodiment of the present invention. Illustration 300 depicts a clustering process as demonstrated in flowchart 200. Illustration 300 contains patched devices 302, a plurality of disparate devices that have received and applied a patch, target platform 304, a specific platform targeted for patch deployment, patched device cluster 306, a cluster model containing a plurality of clustered patched devices organized by platform similarity, clustering features 308, a table of clustering features wherein each row in the table corresponds to a previously patched device. In Illustration 300, program 150 clusters patched devices 302 into a plurality of platform clusters (e.g., patched device cluster 306) representing clusters of similar platforms utilizing corresponding feature data contained within clustering features 308, for example, program 150 creates a plurality of clusters utilizing the number of incidents by reducing patch tests feature. Further in Illustration 300, program 150 calculates a similarity index utilizing the distance from target platform 304 to the center of each cluster contained in patched device cluster 306.

Figure 4:
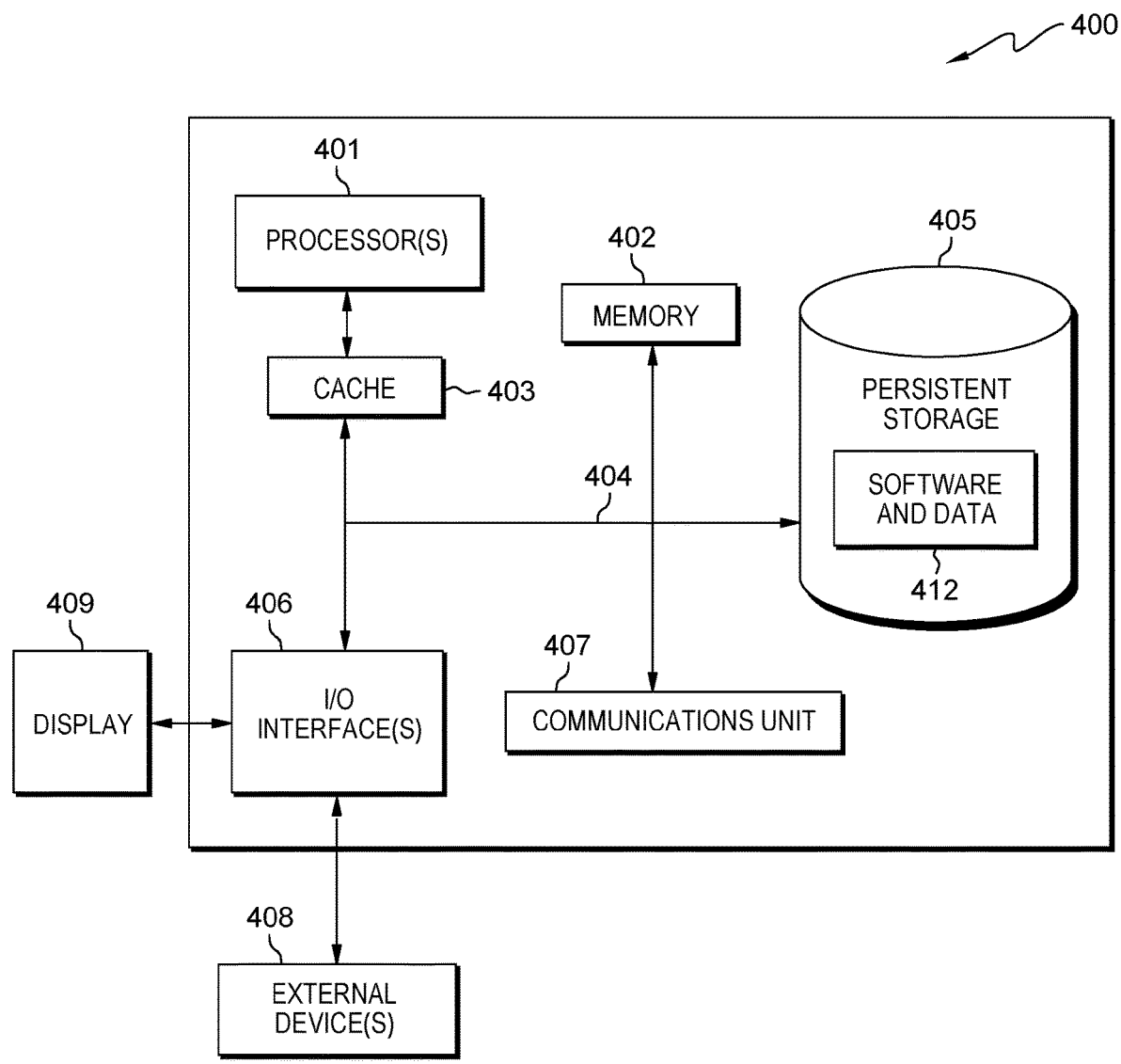
FIG. 4 is a block diagram of components of the server computer, in accordance with an embodiment of the present invention.

FIG. 4 depicts block diagram 400 illustrating components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving, by one or more computer processors, a patch request containing a testing requirement for a target platform;
    creating, by one or more computer processors, a plurality of clusters containing a plurality of previously patched platforms associated with the target platform;
    calculating, by one or more computer processors, a similarity index of previously patched platforms and the target platform utilizing the created plurality of clusters, wherein the similarity index represents a similarity between the target platform and the plurality of patched platforms;
    adjusting, by one or more computer processors, the testing requirement utilizing one or more similar platforms that are determined by the calculated similarity index and associated testing requirements; and
    executing, by one or more computer processors, the requested patch utilizing the adjusted testing requirement.

2. The computer-implemented method of claim 1, further comprising:
tracking, by one or more computer processors, one or more incidents related to the executed patch for dynamic adjustment of the testing requirement and subsequent patching to unpatched platforms similar to the target platform.

3. The computer-implemented method of claim 1, wherein platform information includes hardware specifications, system preferences, application preferences, user preferences, software dependencies and version information, and platform category.

4. The computer-implemented method of claim 1, wherein calculating the similarity index of previously patched platforms and the target platform utilizing the created plurality of clusters, wherein the similarity index represents the similarity between the target platform and the plurality of patched platforms, comprises:
calculating, by one or more computer processors, the similarity index by calculating a Euclidean distance between a respective center of each cluster in the plurality of clusters to the target platform.

5. The computer-implemented method of claim 1, wherein each clustered platform in the plurality of clustered platforms is associated with a respective testing requirement.

6. The computer-implemented method of claim 1, wherein executing the requested patch utilizing the adjusted testing requirement, comprises:
requesting, by one or more computer processors, an approval for the execution of the requested patch utilizing an adjusted test requirement.

7. The computer-implemented method of claim 1, wherein calculating the similarity index of previously patched platforms and the target platform utilizing the created plurality of clusters, wherein the similarity index represents the similarity between the target platform and the plurality of patched platforms, further comprises:
determining, by one or more computer processors, a scope associated with the requested patch; and
adjusting, by one or more computer processors, the calculated similarity index based on the determined scope.

8. The computer-implemented method of claim 1, wherein each cluster in the plurality of clusters utilize one or more features including incidents caused by a testing reduction, system flavor, operating system version, software names and versions.

9. The computer-implemented method of claim 1, wherein the plurality of previously patched platforms includes platforms that have had previously applied patches, platforms that depend on the target platform, and platforms that are dependent on the target platform.

10. A computer program product comprising:
one or more computer readable storage media and program instructions stored on the one or more computer readable storage media, the stored program instructions comprising:
program instructions to receive a patch request containing a testing requirement for a target platform;
program instructions to create a plurality of clusters containing a plurality of previously patched platforms associated with the target platform;
program instructions to calculate a similarity index of previously patched platforms and the target platform utilizing the created plurality of clusters, wherein the similarity index represents a similarity between the target platform and the plurality of patched platforms;
program instructions to adjust the testing requirement utilizing one or more similar platforms that are determined by the calculated similarity index and associated testing requirements; and
program instructions to execute the requested patch utilizing the adjusted testing requirement.

11. The computer program product of claim 10, wherein the program instructions, stored on the one or more computer readable storage media, further comprise:
program instructions to track one or more incidents related to the executed patch for dynamic adjustment of the testing requirement and subsequent patching to unpatched platforms similar to the target platform.

12. The computer program product of claim 10, wherein platform information includes hardware specifications, system preferences, application preferences, user preferences, software dependencies and version information, and platform category.

13. The computer program product of claim 10, wherein the program instructions, to calculate the similarity index of previously patched platforms and the target platform utilizing the created plurality of clusters, wherein the similarity index represents the similarity between the target platform and the plurality of patched platforms, comprise:
program instructions to calculate the similarity index by calculating a Euclidean distance between a respective center of each cluster in the plurality of clusters to the target platform.

14. The computer program product of claim 10, wherein the program instructions, to calculate the similarity index of previously patched platforms and the target platform utilizing the created plurality of clusters, wherein the similarity index represents the similarity between the target platform and the plurality of patched platforms, further comprise:
program instructions to determine a scope associated with the requested patch; and
program instructions to adjust the calculated similarity index based on the determined scope.

15. A computer system comprising:
one or more computer processors;
one or more computer readable storage media; and
program instructions stored on the computer readable storage media for execution by at least one of the one or more processors, the stored program instructions comprising:
program instructions to receive a patch request containing a testing requirement for a target platform;
program instructions to create a plurality of clusters containing a plurality of previously patched platforms associated with the target platform;
program instructions to calculate a similarity index of previously patched platforms and the target platform utilizing the created plurality of clusters, wherein the similarity index represents a similarity between the target platform and the plurality of patched platforms;
program instructions to adjust the testing requirement utilizing one or more similar platforms that are determined by the calculated similarity index and associated testing requirements; and
program instructions to execute the requested patch utilizing the adjusted testing requirement.

16. The computer system of claim 15, wherein the program instructions, stored on the one or more computer readable storage media, further comprise:
program instructions to track one or more incidents related to the executed patch for dynamic adjustment of the testing requirement and subsequent patching to unpatched platforms similar to the target platform.

17. The computer system of claim 15, wherein platform information includes hardware specifications, system preferences, application preferences, user preferences, software dependencies and version information, and platform category.

18. The computer system of claim 15, wherein the program instructions, to calculate the similarity index of previously patched platforms and the target platform utilizing the created plurality of clusters, wherein the similarity index represents the similarity between the target platform and the plurality of patched platforms, comprise:
   program instructions to calculate the similarity index by calculating a Euclidean distance between a respective center of each cluster in the plurality of clusters to the target platform.

19. The computer system of claim 15, wherein the program instructions, to calculate the similarity index of previously patched platforms and the target platform utilizing the created plurality of clusters, wherein the similarity index represents the similarity between the target platform and the plurality of patched platforms, further comprise:
   program instructions to determine a scope associated with the requested patch; and
   program instructions to adjust the calculated similarity index based on the determined scope.

20. The computer system of claim 15, wherein each clustered platform in the plurality of clustered platforms is associated with a respective testing requirement.

\* \* \* \* \*